United States Patent
Iordache et al.

(10) Patent No.: US 9,438,523 B2
(45) Date of Patent: Sep. 6, 2016

(54) METHOD AND APPARATUS FOR DERIVING A PACKET SELECT PROBABILITY VALUE

(71) Applicants: Florinel Iordache, Bucharest (RO); George Stefan, Bucharest (RO)

(72) Inventors: Florinel Iordache, Bucharest (RO); George Stefan, Bucharest (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 85 days.

(21) Appl. No.: 14/261,548

(22) Filed: Apr. 25, 2014

(65) Prior Publication Data

US 2015/0244639 A1    Aug. 27, 2015

(30) Foreign Application Priority Data

Feb. 24, 2014    (RO) .................................. 14-00148

(51) Int. Cl.
| | |
|---|---|
| *H04L 12/26* | (2006.01) |
| *H04L 12/851* | (2013.01) |
| *H04L 12/801* | (2013.01) |
| *H04L 12/835* | (2013.01) |

(52) U.S. Cl.
CPC .......... *H04L 47/2441* (2013.01); *H04L 47/29* (2013.01); *H04L 47/30* (2013.01)

(58) Field of Classification Search
None
See application file for complete search history.

(56) References Cited

U.S. PATENT DOCUMENTS

| | | | |
|---|---|---|---|
| 7,286,550 B2* | 10/2007 | Modali ................... | H04L 47/10 370/235 |
| 7,944,829 B2 | 5/2011 | Narvaez et al. | |
| 8,234,400 B2* | 7/2012 | Bansal ................. | H04L 29/0863 370/234 |
| 2003/0223362 A1* | 12/2003 | Mathews ............ | H04L 12/5693 370/230 |
| 2003/0223366 A1* | 12/2003 | Jeffries ................... | H04L 47/10 370/231 |
| 2004/0100901 A1* | 5/2004 | Bellows .................. | H04L 47/10 370/230 |
| 2006/0045009 A1* | 3/2006 | Madison ................. | H04L 47/10 370/229 |
| 2006/0171318 A1* | 8/2006 | Bergamasco ........... | H04L 47/10 370/235 |
| 2007/0070907 A1* | 3/2007 | Kumar .................... | H04L 47/10 370/235 |
| 2007/0237074 A1* | 10/2007 | Curry ...................... | H04L 47/10 370/229 |
| 2013/0235725 A1 | 9/2013 | Lamb et al. | |
| 2013/0286834 A1* | 10/2013 | Lee ........................ | H04L 47/326 370/235 |
| 2015/0029887 A1* | 1/2015 | Briscoe ................. | H04L 47/326 370/252 |

OTHER PUBLICATIONS

Liu, S. et al., "Exponential-RED: A Stabilizing AQM Scheme for Low- and High-Speed TCP Protocols," IEEE/ACM Transactions on Networking, vol. 13, issue 5; ISSN: 1063-6692; Nov. 7, 2005; pp. 1068-1081.

* cited by examiner

*Primary Examiner* — Michael J Moore, Jr.

(57) ABSTRACT

A method and apparatus for deriving a packet select probability value for a data packet. The method comprises determining a queue length value for a target buffer of the data packet, calculating a queue congestion value based at least partly on the queue length value and a packet select queue length range, and calculating the packet select probability value for the data packet based at least partly on an exponential function $e^{-x}$, where x is computed based at least partly on the queue congestion value.

18 Claims, 5 Drawing Sheets

METHOD AND APPARATUS FOR DERIVING A PACKET SELECT PROBABILITY VALUE

CROSS REFERENCE TO RELATED APPLICATIONS

The present application is claims priority to Romanian Patent Application No. 2014 00148, filed Feb. 24, 2014, entitled "METHOD AND APPARATUS FOR DERIVING A PACKET SELECT PROBABILITY VALUE," the entirety of which is herein incorporated by reference.

FIELD OF THE INVENTION

This invention relates to a method and apparatus for deriving a packet select probability value, and in particular to a method and apparatus for deriving a packet select probability value as part of active queue management.

BACKGROUND OF THE INVENTION

In the field of data networking, a network router typically maintains a set of queues, one per interface. Each queue holds packets scheduled to be transmitted over the respective interface. Historically, such queues used a drop-tail techniques whereby a packet is put onto the queue if the queue is shorter than its maximum size (measured in packets or in bytes), and otherwise dropped.

However, such drop-tail queuing approaches have a tendency to penalise bursty traffic flows, and to cause global synchronisation between traffic flows (the occurrence of simultaneous packet loss across many traffic flows as a result of a sudden burst of traffic, resulting in each affected traffic flow backing off its send rate at the same time, causing link utilization to drop significantly).

Active queue management (AQM) is the arbitrary reordering or dropping of network packets inside the transmit buffer of a network interface controller. By dropping packets probabilistically, AQM techniques have less of a tendency to penalise bursty flows and are typically able to avoid the problem of global synchronisation. AQM techniques drop or mark packets before the queue is full. Typically, they operate by maintaining one or more drop/mark probabilities, and probabilistically dropping or marking packets even when the queue is short. Such dropping/marking of packets provides endpoints with congestion indications before the queue is full. In this manner, AQM techniques are able to maintain shorter queue lengths than the conventional drop-tail techniques, helping to combat 'buffer-bloat' and reducing network latency.

Random early detection (RED), also known as random early discard or random early drop, is an early form of AQM. An objective of RED is to maintain an average queue size below a minimum threshold. In this manner, spare queue capacity is maintained to cope with short bursts of traffic. If the average queue size exceeds the minimum threshold, packets are randomly 'marked' based on some probability algorithm and their sources notified of congestion to reduce the window for that traffic flow. Such marking and notification may comprise simply discarding/dropping of the packet, setting a bit in a packet header, or some other feedback method understood by the transport protocol. The current feedback mechanism in TCP/IP networks is for packets to simply be dropped.

The RED algorithm uses randomization in choosing which arriving packets to drop (or mark when used in conjunction with, say, Explicit Congestion Notification—ECN). In this manner, the probability of marking a packet from a particular connection is roughly proportional to that connection's share of the bandwidth through the gateway. The algorithm monitors the average queue size and drops (or marks) packets based on statistical probabilities, and in particular based on a discard probability calculated based on the average queue length.

FIG. 1 illustrates the discard probability for a conventional RED algorithm against average queue length. If the buffer is almost empty (i.e. the queue length is below a minimum threshold 110), all incoming packets are accepted. As the queue grows and the average queue length exceeds the minimum threshold 110, the probability for dropping an incoming packet grows too. When the average queue length exceeds a maximum threshold 120, the probability of dropping (or marking) a packet becomes 1 and all incoming packets are dropped (or marked). As such, the minimum threshold value and the maximum threshold value define a packet discard queue length range maxTH-minTH. The discard probability for the conventional RED algorithm illustrated in FIG. 1 may be expressed as:

$$DP = \begin{cases} 0 & \text{for } 0 \leq Av \leq minTH \\ \frac{Av - minTH}{maxTH - minTH} * MaxDP & \text{for } minTH < Av \leq maxTH \\ 1 & \text{for for } maxTH < Av \end{cases} \quad \text{[Equation 1]}$$

RED is more fair than tail drop, in the sense that it does not possess a bias against bursty traffic that uses only a small portion of the bandwidth. The more a host transmits, the more likely it is that its packets are dropped (or marked) as the probability of a host's packet being dropped is proportional to the amount of data it has in a queue. Furthermore, the early detection of congestion helps avoid TCP global synchronization.

A limitation of the conventional RED algorithm for deriving the packet discard probability value, defined in Equation 1 above, is that the packet discard rate is too aggressive when the (average) queue length exceeds the minimum threshold value minTH by only a small amount, and too lenient (i.e. not aggressive enough) when the queue length is close to the maximum threshold value maxTH.

SUMMARY OF THE INVENTION

The present invention provides a method of deriving a packet select probability value for a data packet, a method of performing active queue management, a data packet routing device, and a non-transitory computer program product having executable program code stored therein for deriving a packet select probability value for a data packet as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are

DETAILED DESCRIPTION OF THE PREFERRED EMBODIMENTS

Figure 1:
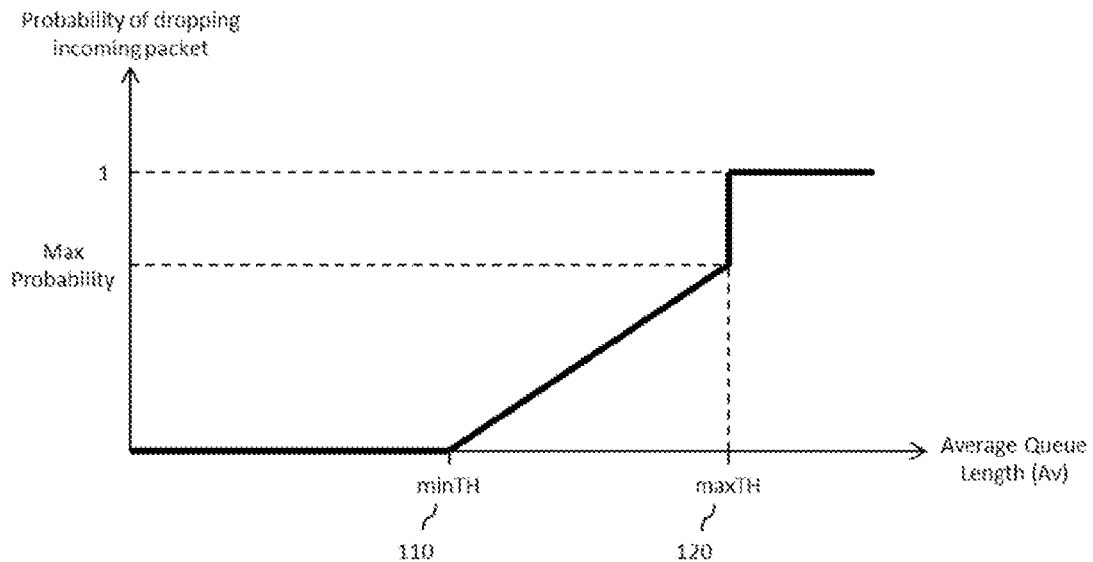
FIG. 1 illustrates discard probability against average queue length for a conventional RED algorithm.

The present invention will now be described with reference to an example of a Random Early Detection (RED) algorithm for use as part of Active Queue Management (AQM) within, say, a network router. However, the present invention is not limited to the specific examples herein described with reference to the accompanying drawings. For example, the present invention is herein described with reference to the use of a RED algorithm whereby the algorithm monitors a queue length value and drops (or discards) packets based on a packet select probability (analogous to the discard probability described in the background of the invention in relation to the conventional RED algorithm) calculated based on the queue length value. Such an implementation assumes a feedback mechanism of the underlying transport protocol based on (or compatible with) the dropping of packets resulting in a form of notification being fed back to the source of the packet that the packet has been dropped/discarded, and thus providing a form of congestion notification to the source of the packet. However, the present invention is not limited to being implemented in conjunction with such a feedback mechanism and may equally be implemented within networks based on transport protocols supporting alternative feedback mechanisms. For example, the present invention may be implemented within a network comprising a transport protocol that supports, say, Explicit Congestion Notification (ECN), whereby the RED algorithm may be arranged to 'mark' a data packet in order to signal (impending) congestion, instead of dropping/discarding the data packet.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

According to some examples of a first aspect of the invention, there is provided a method of deriving a packet select probability value for a data packet. The method comprises determining a queue length value for a target buffer of the data packet, calculating a queue congestion value based at least partly on the queue length value and a packet select queue length range, and calculating the packet select probability value for the data packet based at least partly on an exponential function $e^{-x}$, where x is computed based at least partly on the queue congestion value.

In this manner, the exponential growth provided by the exponential function $e^{-x}$ has the very useful property that the growth rate of the packet select probability value is proportional to the queue congestion value's current value. As such, exponential growth initially has a moderate growth which then becomes more and more emphasized, which provide a more lenient packet select rate at lower queue congestion values whilst providing a more aggressive packet select rate at higher queue congestion value.

In some optional examples, the queue congestion value $Q_{con}$ may be calculated based on:

$$Q_{con} = \frac{\text{max}TH - Av}{\text{max}TH - \text{min}TH}$$

where Av represents the determined queue length value, maxTH represents a maximum queue length threshold and minTH represents a minimum queue length threshold; maxTH-minTH defining the packet select queue length range.

In some optional examples, x may be further computed based on an aggressiveness factor K, such that $x=K*Q_{con}$.

In some optional examples, the aggressiveness factor K may comprise a user configurable aggressiveness factor.

In some alternative examples, the aggressiveness factor K may comprise an adaptively configurable aggressiveness factor.

In some optional examples, the queue length value may comprise an average queue length for the target buffer of the data packet.

In some optional examples, the queue length value Av may be calculated based on:

$$Av = Ao*(1-2^{-n}) + Qc*(2^{-n})$$

where n represents a user configurable weighting factor, Ao represents a previously determined average queue length value and Qc represents a current queue length.

In some optional examples, the method further may comprise determining a class of traffic to which the data packet belongs, obtaining a set of active queue management parameters for the determined class of traffic and deriving a packet select probability value for the data packet based at least partly on the obtained set of active queue management parameters.

In some optional examples, the set of active queue management parameters may comprise at least one from a group comprising at least one of:

a maximum queue length threshold maxTH;
a minimum queue length threshold minTH; and
an aggressiveness factor K.

In some optional examples, the method may form part of a random early detection active queue management process.

According to some examples of a second aspect of the invention, there is provided a method of performing active queue management, the method comprising deriving a packet select probability value for a data packet in accordance with the first aspect of the invention.

In some optional examples, the active queue management method may comprise a random early detection method.

According to some examples of a third aspect of the invention, there is provided a data packet routing device comprising at least one signal processing component arranged to derive a packet select probability value for a data packet. The signal processing component is arranged to determine a queue length value for a target buffer of the data packet, calculate a queue congestion value based at least partly on the queue length value and a packet select queue length range, and calculate the packet select probability value for the data packet based at least partly on an exponential function $e^{-x}$, where x is computed based at least partly on the queue congestion value.

According to some examples of a fourth aspect of the invention, there is provided a non-transitory computer program product having executable program code stored therein for deriving a packet select probability value for a data packet. The program code is operable for determining a queue length value for a target buffer of the data packet, calculating a queue congestion value based at least partly on the queue length value and a packet select queue length range, and calculating the packet select probability value for the data packet based at least partly on an exponential function $e^{-x}$, where x is computed based at least partly on the queue congestion value.

In some optional examples, the non-transitory computer program product may comprise at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

Figure 2:
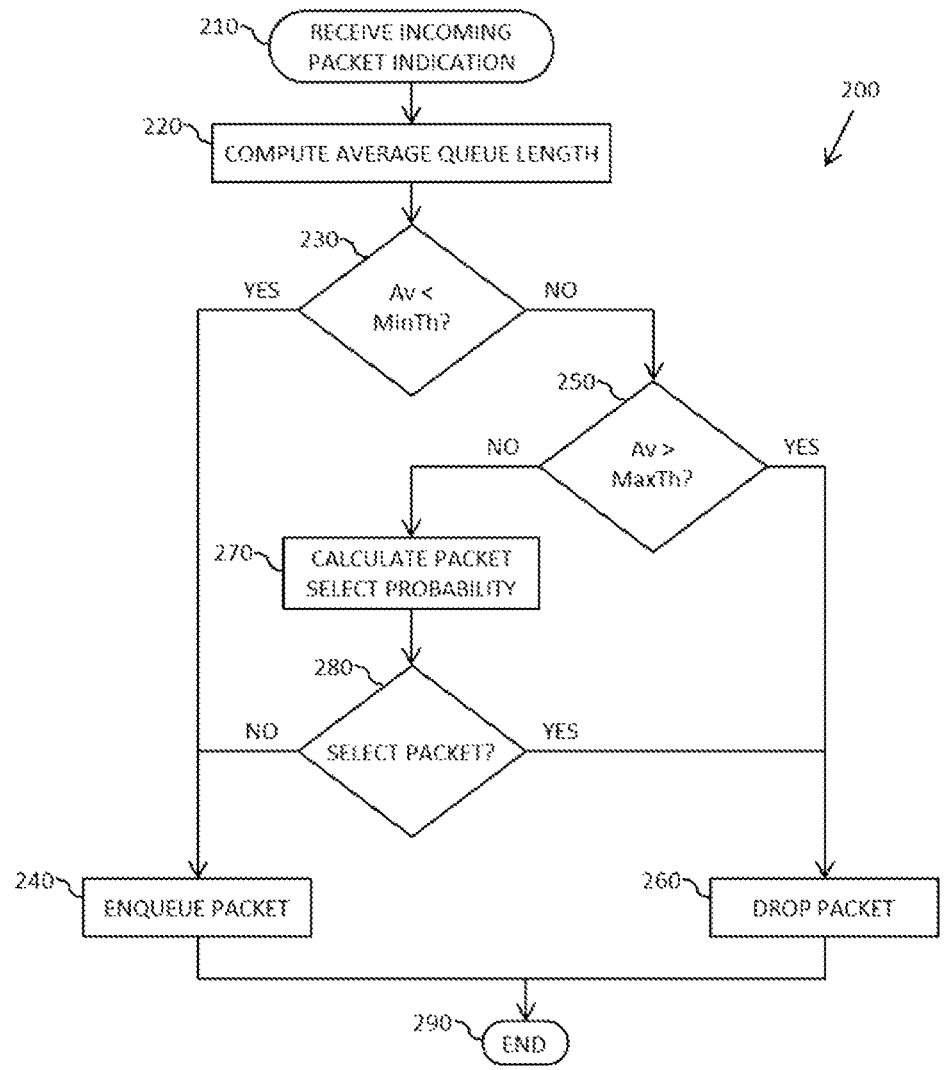
FIG. 2 illustrates a simplified flowchart of an example of a method of performing Active Queue Management.

Referring now to FIG. 2 there is illustrated a simplified flowchart 200 of an example of a method of performing Active Queue Management within, say, a network router or the like, and in particular to a method of performing random early detection. The method starts at 210 with the receipt of an indication of an incoming data packet. Such an indication may comprise summary data about the incoming data packet such as information identifying a target buffer etc. Alternatively, such an indication may comprise the data packet itself. Next, at 220, a value representative of a queue length for a target buffer is determined. In the illustrated example, the determined queue length value comprises an average queue length value representative of an average queue length for the target buffer over a period of time. An example of how such an average queue length Av may be computed is provided below in Equation 2:

$$Av=Ao*(1-2^{-n})=Qc*(2^{-n})$$ [Equation 2]

where n represents a user configurable exponential weight factor, Ao represents an old (previous) average queue length value for the target buffer, and Qc represents the current queue length for the target buffer. Having determined the queue length value for the target buffer, at 220, the method moves on to 230 where it is determined whether the determined queue length value is less than a minimum threshold value minTH.

If the determined queue length value is less than the minimum threshold value minTH, then the received incoming packet is queued within the target buffer at 240, and the method ends at 290.

Conversely, if the determined queue length value is greater than the minimum threshold value minTH, the method moves on to 250 where it is determined whether the determined queue length value is greater than a maximum threshold value maxTH.

If the determined queue length value is greater than a maximum threshold value maxTH, then in the illustrated example the packet is dropped/discarded at 260, and the method ends at 290.

Conversely, if the determined queue length value is less than a maximum threshold value maxTH, the method moves on to 270 where a packet select probability value for the received data packet is derived based on the queue length value determined at 220, for example as described in greater detail below. For clarity, the packet select probability value is analogous to the discard probability value described above in relation to the conventional RED algorithm within the background of the invention, and defined in Equation 1. The term packet select probability value is used herein with reference to the present invention to clarify that a 'selected' packet is not limited to being dropped/discarded, but may alternatively be marked (e.g. by way of a bit being set in the packet header) if the underlying transport protocol supports, say, Explicit Congestion Notification (ECN).

Having derived the packet select probability value, the method moves on to 280 wherein it is (randomly) determined whether to select the data packet based on the packet select probability value.

If it is determined not to select the data packet at 280, then the received incoming packet is queued within the target buffer at 240, and the method ends at 290.

Conversely, if it is determined to select the data packet at 280, then in the illustrated example the packet is dropped/discarded at 260, and the method ends at 290. In alternative examples, for example where the method of FIG. 2 is implemented within a network comprising a transport protocol that supports, say, Explicit Congestion Notification (ECN), if it is determined to select the data packet at 280, then the data packet may be marked (e.g. by way of a bit being set within a header thereof) in order to signal (impending) congestion, instead of dropping/discarding the data packet. In such an example, having been marked the data packet may then be queued within the target buffer (as opposed to being dropped/discarded).

A limitation of the conventional RED algorithm for deriving the packet discard (select) probability value, defined in Equation 1 above, is that the packet discard/select rate is too aggressive when the (average) queue length exceeds the minimum threshold value minTH by only a small amount, and too lenient (i.e. not aggressive enough) when the queue length is close to the maximum threshold value maxTH.

The inventors for the present invention have recognised that exponential growth has the very useful property that the growth rate is proportional to the function's current value. As such, exponential growth initially has a moderate growth which then becomes more and more emphasized, which may be used to provide a more lenient packet select rate at lower queue lengths whilst providing a more aggressive packet select rate at high queue lengths.

Figure 3:
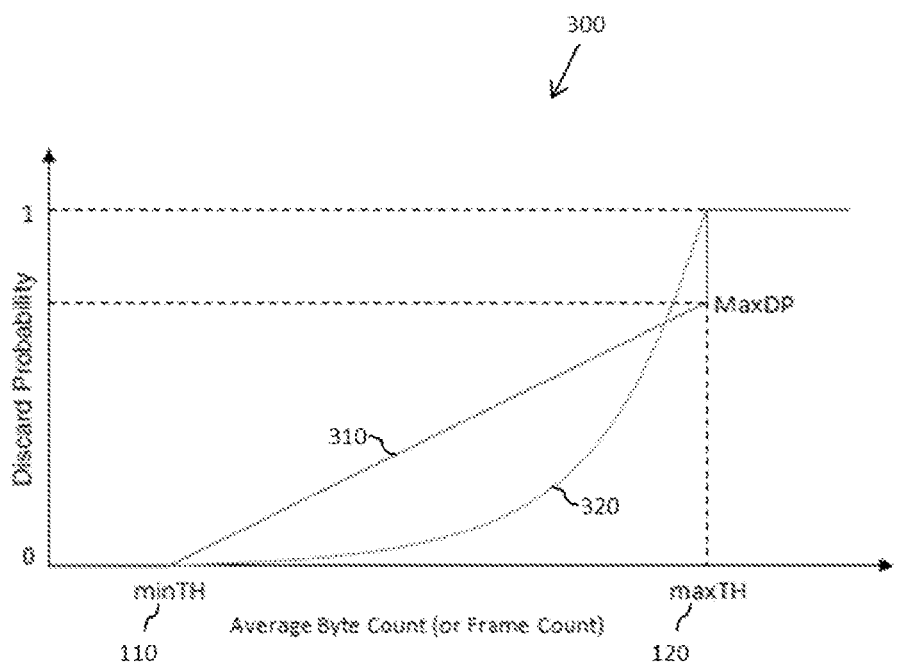
FIGS. 3 to 6 illustrate comparisons of packet select probability values over average queue lengths for a conventional RED algorithm and an exponential growth based RED algorithm.

FIG. 3 illustrates a simplified graph 300 showing an example of a comparison between the packet discard (select) probability value versus average queue length (measured as byte/frame count) 310 for the conventional RED algorithm of Equation 1 and the packet select probability versus average queue length 320 for an exponential growth based RED algorithm. In the example illustrated in FIG. 3, the minimum threshold value maxTH and the maximum threshold value minTH define a packet select queue length range maxTH-minTH.

As can be seen from the graph 300 illustrated in FIG. 3, an exponential growth based RED algorithm has the potential to improve on the above identified limitation of the conventional RED algorithm by using an exponential growth in order to be initially more lenient than the conventional RED algorithm for small average queue lengths and then more aggressive than the conventional RED algorithm for large average queue lengths. Specifically, leniency may be shifted toward the minimum threshold minTH 110 and aggressiveness may be shifted toward maximum threshold maxTH 120. This characteristic of an exponential growth based RED algorithm provides a better packet select probability because early packet selection is delayed as much as possible (i.e. packet selection is weighted more towards the maximum threshold maxTH 120). This characteristic accomplishes the goal of preventing queue buffer overrun while avoiding too early discarding/marking of data packets.

The exponential RED packet select probability algorithm proposed by the inventors comprises calculating the packet select probability value for a received data packet based on an exponential function $e^{-x}$, where x is computed based on a queue congestion value calculated based (at least partly) on the queue length value. Equation 3 below is an example of an exponential RED packet select probability algorithm proposed by the inventors:

$$DP = \begin{cases} 0 & \text{for } 0 \leq Av \leq \text{min}TH \\ e^{-K\frac{\text{max}TH - Av}{\text{max}TH - \text{min}TH}} & \text{for min}TH < Av \leq \text{max}TH \\ 1 & \text{for for max}TH < Av \end{cases} \quad \text{[Equation 3]}$$

where DP is the packet select probability, K is an aggressiveness factor and Av a value representative of a queue length for a target buffer such as the average queue length value calculated by way of Equation 2 above. In the example provided by Equation 3, the queue congestion value is calculated based on the difference between the queue length value Av and the maximum threshold maxTH, as defined by maxTH−Av, divided by the packet select queue length range maxTH−minTH, which provides a value representative of the relative position of the queue length value Av within the packet select queue length range maxTH−minTH. Furthermore, in the example provided by Equation 3, the value x for the exponential function $e^{-x}$ is further computed based an aggressiveness factor K, such that $x=K*Q_{con}$, where $Q_{con}$ represents the queue congestion value.

In some examples, the aggressiveness factor K may comprise a user configurable aggressiveness factor, enabling a user to configure how aggressively or leniently the exponential RED packet select probability algorithm causes received data packets to be selected.

In some further alternative examples, the aggressiveness factor K comprises an adaptively configurable aggressiveness factor, whereby the value of the aggressiveness factor K may be heuristically adapted based on historic system performance. In this manner, the exponential RED packet select probability algorithm proposed by the inventors may 'learn' and be automatically adapted in order to optimise the performance of the system.

Advantageously, by calculating packet select probability values for received data packet based on such an exponential function $e^{-x}$, arriving packets are selected with exponential increasing probability as the queue length increases, enabling packet loss (e.g. due to the discarding of selected packets) to be reduced whilst optimising queue utilisation.

To compare the behaviour of the exponential RED algorithm proposed by the inventors to the conventional RED algorithm, we can set the packet discard/select probability formulas (Equation 1 for the conventional algorithm and Equation 3 for the exponential RED algorithm proposed by the inventors) as equal:

$$\frac{Av - \text{min}TH}{\text{max}TH - \text{min}TH} * \text{Max}DP = e^{-K\frac{\text{max}TH - Av}{\text{max}TH - \text{min}TH}} \quad \text{[Equation 4]}$$

$$\frac{Av - \text{min}TH}{\text{max}TH - \text{min}TH} * \text{Max}DP = \quad \text{[Equation 5]}$$
$$e^{-K\frac{\text{max}TH}{\text{max}TH - \text{min}TH}} * e^{K\frac{Av}{\text{max}TH - \text{min}TH}}$$

$$\frac{Av - \text{min}TH}{\text{max}TH - \text{min}TH} * \text{Max}DP * e^{K\frac{\text{max}TH}{\text{max}TH - \text{min}TH}} = \quad \text{[Equation 6]}$$
$$e^{K\frac{Av}{\text{max}TH - \text{min}TH}}$$

$$\left[\frac{\text{Max}DP}{\text{max}TH - \text{min}TH} * e^{-K\frac{\text{max}TH}{\text{max}TH - \text{min}TH}}\right] * (Av - \text{min}TH) = \quad \text{[Equation 7]}$$
$$e^{K\frac{Av}{\text{max}TH - \text{min}TH}}$$

The resulting equation, Equation 7, is a transcendental equation of the form:

$$a(x-r) = e^{-cx} \quad \text{[Equation 8]}$$

with solutions expressed by the Lambert W function:

$$x = r + \frac{1}{c}W\left(\frac{ce^{-cr}}{a}\right) \quad \text{[Equation 9]}$$

Solutions obtained by resolving this equation represent the values of the average queue length Av where the two algorithms have the same packet select probability (DP):

$$Av = \text{min}TH - \frac{\text{max}TH - \text{min}TH}{K} \quad \text{[Equation 10]}$$
$$W\left(\frac{\frac{-K}{\text{max}TH - \text{min}TH} * e^{\frac{K}{\text{max}TH - \text{min}TH}\text{min}TH}}{\frac{\text{Max}DP}{\text{max}TH - \text{min}TH} * e^{\frac{K}{\text{max}TH - \text{min}TH}\text{max}TH}}\right)$$

$$Av = \text{min}TH - \frac{\text{max}TH - \text{min}TH}{K} W \quad \text{[Equation 11]}$$
$$\left(\frac{-K * e^{K\frac{\text{min}TH}{\text{max}TH - \text{min}TH}}}{\text{max}TH - \text{min}TH} * \frac{\text{max}TH - \text{min}TH}{\text{Max}DP * e^{K\left(\frac{\text{max}TH}{\text{max}TH - \text{min}TH}\right)}}\right)$$

$$Av = \text{min}TH - \frac{\text{max}TH - \text{min}TH}{K} \quad \text{[Equation 12]}$$
$$W\left(\frac{-K * e^{K\left(\frac{\text{min}TH}{\text{max}TH - \text{min}TH} - \frac{\text{max}TH}{\text{max}TH - \text{min}TH}\right)}}{\text{Max}DP}\right)$$

$$Av = \quad \text{[Equation 13]}$$
$$\text{min}TH - \frac{\text{max}TH - \text{min}TH}{K} W\left(\frac{-K * e^{K\left(\frac{-(\text{max}TH - \text{min}TH)}{\text{max}TH - \text{min}TH}\right)}}{\text{Max}DP}\right)$$

$$Av = \text{min}TH - \frac{\text{max}TH - \text{min}TH}{K} W\left(\frac{-K}{\text{Max}DP} * e^{-K}\right) \quad \text{[Equation 14]}$$

The values MaxDP and $e^{-K}$ are both positive values (i.e. >0).

As such $$\left(\frac{-K}{\text{Max}DP} * e^{-K}\right) < 0,$$

which means:

$$W\left(\frac{-K}{\text{Max}DP} * e^{-K}\right) = \begin{cases} \text{Undefined} & \text{for } \left(\frac{-K}{\text{Max}Dp} * e^{-K}\right) < -\frac{1}{e} \\ -1 & \text{for } \left(\frac{-K}{\text{Max}DP} * e^{-K}\right) = -\frac{1}{e} \\ 2 \text{ negative values} & \text{for } \left(\frac{-K}{\text{Max}DP} * e^{-K}\right) > -\frac{1}{e} \end{cases}$$ [Equation 15]

Which in turn means:

$$Av = \begin{cases} \text{No solution} & \text{for } Ke^{-1} > \text{Max}DP \\ \text{min}TH + \frac{\text{max}TH - \text{min}TH}{K} & \text{for } Ke^{1-K} = \text{Max}DP \\ \text{min}TH < 2 \text{ sol.} < \text{max}TH & \text{for } Ke^{1-K} < \text{Max}DP \end{cases}$$ [Equation 16]

Figure 4:
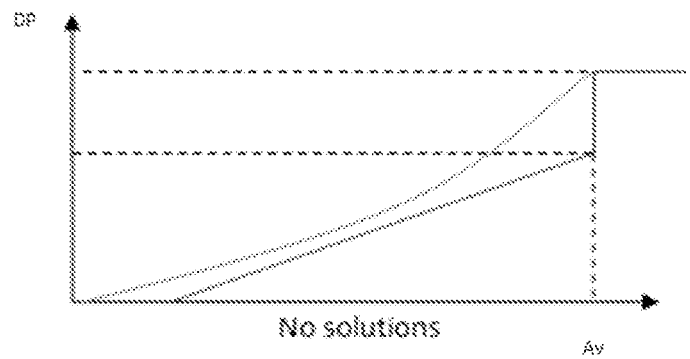

FIG. 4 illustrates a comparison of the packet select probability DP over average queue length Av for the two algorithms in the case where $Ke^{1-K} > \text{Max}DP$. As can been seen in this case the two plots never cross, meaning there is no solution where the two algorithms have the same packet select probability. As clearly illustrated in FIG. 4, in this case where $Ke^{1-K} > \text{Max}DP$, the behaviour of the exponential RED algorithm proposed by the inventors is less desirable than the conventional RED algorithm since it results in a more aggressive packet discard rate at every point, and in particular at lower average queue lengths.

Figure 5:
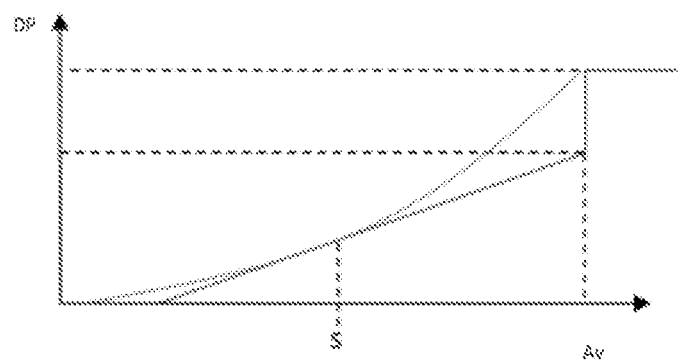

FIG. 5 illustrates a comparison of the packet select probability DP over average queue length Av for the two algorithms in the case where $Ke^{1-K} = \text{Max}DP$. As can be seen in this case the two plots converge and make contact at a single point before again diverging. Thus, in this case there is a single solution where the two algorithms have the same packet select probability. From FIG. 5 it can be seen that in this case where $Ke^{1-K} = \text{Max}DP$, the behaviour of the exponential RED algorithm proposed by the inventors is more desirable than the case where $Ke^{1-K} > \text{Max}DP$, but is still less desirable that the conventional RED algorithm since it still results in a more aggressive packet discard rate at every point other than where the two plots touch, and in particular at lower average queue lengths.

Figure 6:
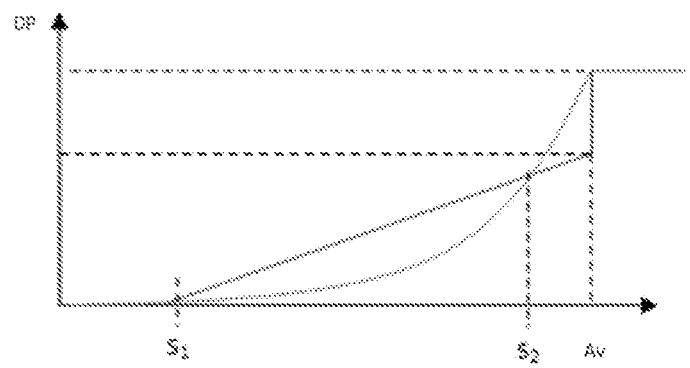

FIG. 6 illustrates a comparison of the packet select probability DP over average queue length Av for the two algorithms in the case where $Ke^{1-K} < \text{Max}DP$. As can be seen in this case the two plots cross at two points enabling the behaviour of the exponential RED algorithm proposed by the inventors to be more desirable than the conventional RED algorithm by providing a more lenient packet discard rate over the majority of the range of average queue lengths, and in particular at lower average queue lengths, and also providing a more aggressive packet discard rate at higher average queue lengths.

Thus, the case illustrated in FIG. 6 where $Ke^{1-K} < \text{Max}DP$ is a good case where there are two average queue length values where the exponential RED algorithm proposed by the inventors has the same packet select probability as the conventional RED algorithm. For all other average queue length values discard probabilities are different, and the two algorithms can be compared in terms of performance. Notably, the exponential RED algorithm proposed by the inventors has a lower packet select probability for average queue lengths situated between these two solutions, which means it is more lenient within this region, and then has a higher packet select probability for average queue lengths greater than second solution which means it is more aggressive in this region.

Since both solutions where the exponential RED algorithm proposed by the inventors has the same packet select probability as the conventional RED algorithm are situated between the two average queue length thresholds (maxTH, minTH), it is desirable for performance criteria that the first solution is located as close as possible to the minimum threshold minTH, with the second solution located inside the interval defined by the first solution and maximum threshold maxTH. The location of this second solution relative to the two thresholds ultimately defines the behaviour of the exponential RED algorithm proposed by the inventors, and its performance improvement relative to the conventional RED algorithm.

Thus, above we have identified that $Ke^{1-K} < \text{Max}DP$ in order to achieve the desired behaviour for the exponential RED algorithm proposed by the inventors. Simulations showed the best values are obtained for aggressiveness factor inside interval: $K=[3:10]$ In order to perform a formal demonstration for the performance of the exponential RED algorithm proposed by the inventors compared with the conventional RED algorithm, we must evaluate partial derivatives for the two algorithms' characteristic functions with respect to average queue length variable (Av) and then obtain an equation by equaling them.

The partial derivative for the conventional RED algorithm may be expressed as:

$$\frac{\partial f_{RED}}{\partial Av} = \frac{\partial}{\partial Av}\left(\frac{Av - \text{min}TH}{\text{max}TH - \text{min}TH} * \text{Max}DP\right) = \frac{\text{Max}DP}{\text{max}TH - \text{min}TH}$$ [Equation 17]

The partial derivative for the exponential RED algorithm proposed by the inventors may be expressed as:

$$\frac{\partial f_{ERED}}{\partial Av} = \frac{\partial}{\partial Av}\left(e^{-K\frac{\text{max}TH - Av}{\text{max}TH - \text{min}TH}}\right) = \frac{K}{\text{max}TH - \text{min}TH} e^{-K\frac{\text{max}TH - Av}{\text{max}TH - \text{min}TH}}$$ [Equation 18]

Equaling the respective partial derivatives gives:

$$\frac{\text{Max}DP}{\text{max}TH - \text{min}TH} = \frac{K}{\text{max}TH - \text{min}TH} e^{-K\frac{\text{max}TH - Av}{\text{max}TH - \text{min}TH}}$$ [Equation 19]

$$e^{-K\frac{\text{max}TH - Av}{\text{max}TH - \text{min}TH}} = \frac{\text{Max}DP}{K}$$ [Equation 20]

$$e^{\frac{K*Av}{\text{max}TH - \text{min}TH} - \frac{K*\text{max}TH}{\text{max}TH - \text{min}TH}} = \frac{\text{Max}DP}{K}$$ [Equation 21]

-continued $$e^{\frac{K*Av}{maxTH-minTH}} * e^{\frac{-K*maxTH}{maxTH-minTH}} = \frac{MaxDP}{K}$$ [Equation 22]

$$e^{\frac{K*Av}{maxTH-minTH}} = \frac{MaxDP}{K} * e^{\frac{K*maxTH}{maxTH-minTH}}$$ [Equation 23]

$$\frac{K*Av}{maxTH-minTH} = \ln\left(\frac{MaxDP}{K} * e^{\frac{K*maxTH}{maxTH-minTH}}\right)$$ [Equation 24]

Solutions obtained by resolving this equation represent the values of average queue length Av where the two algorithms have the same slope. Since the conventional RED algorithm has a linear growth its slope is constant. However, but because the exponential RED algorithm proposed by the inventors has an exponential growth its slope varies in an exponential manner. This means that initially the exponential RED algorithm proposed by the inventors has a lower slope and a moderate growth which becomes more and more emphasized and eventually the exponential RED algorithm proposed by the inventors will have a higher slope than the conventional RED algorithm. Thus, somewhere in between the exponential RED algorithm proposed by the inventors having a lower slope and a higher slope then the conventional RED algorithm, the two algorithms will have the same slope which is represented by the solution of this equation.

In order to meet the performance criteria about leniency shifted toward the minimum threshold minTH and aggressiveness shifted toward maximum threshold maxTH this solution must be situated between the two thresholds. As such, we need to show that minTH<Av<maxTH. We can achieve this by first rearranging Equation 24 above as follows:

$$Av = \frac{maxTH - minTH}{K} * \ln\left(\frac{MaxDP}{K} * e^{\frac{K*maxTH}{maxTH-minTH}}\right)$$ [Equation 25]

$$Av = \frac{maxTH - minTH}{K} * \left(\ln\frac{MaxDP}{K} + \ln e^{\frac{K*maxTH}{maxTH-minTH}}\right)$$ [Equation 26]

$$Av = \frac{maxTH - minTH}{K} * \left(\ln\frac{MaxDP}{K} + \frac{K*maxTH}{maxTH-minTH}\right)$$ [Equation 27]

$$Av = maxTH + \frac{maxTH - minTH}{K} * \ln\frac{MaxDP}{K}$$ [Equation 28]

Looking first at the requirement that Av<maxTH, we know that maxDP<1, and K>1. Accordingly $$\frac{maxDP}{K} < 1$$

and therefore ln $$\frac{MaxDP}{K} < 0.$$

We also know that maxTH-minTH>0. Thus, from Equation 28 we can see that Av<maxTH, since ln $$\frac{MaxDP}{K} < 0$$

and maxTH-minTH>0 make $$\frac{maxTH - minTH}{K} * \ln\frac{MaxDP}{K}$$

a negative value.

Looking next at the requirement that minTH<Av, to satisfy this the following must be true from Equation 28:

$$minTH < maxTH + \frac{maxTH - minTH}{K} * \ln\frac{MaxDP}{K}$$ [Equation 29]

$$0 < $$ [Equation 30]
$$maxTH - minTH + \frac{maxTH - minTH}{K} * \ln\frac{MaxDP}{K}$$

$$0 < (maxTH - minTH) * \left(1 + \frac{\ln\frac{MaxDP}{K}}{K}\right)$$ [Equation 31]

In order for minTH<Av, maxTH-minTH<0 must be true (since maxTH>Av. Accordingly, for maxTH-minTH<0 to be true, we need to show that:

$$\left(1 + \frac{\ln\frac{MaxDP}{K}}{K}\right) > 0$$ [Equation 32]

$$\frac{\ln\frac{MaxDP}{K}}{K} > -1$$ [Equation 33]

$$\ln\frac{MaxDP}{K} > -K$$ [Equation 34]

$$\frac{MaxDP}{K} > e^{-K}$$ [Equation 35]

$$MaxDP > Ke^{-K}$$ [Equation 36]

As identified above in relation to Equation 16 and FIG. 6, we are interested in the case where MaxDP>Ke$^{1-K}$. Accordingly, because Ke$^{1-K}$>Ke$^{-K}$, it must be true that MaxDP>Ke$^{-K}$. Thus, minTH<Av.

From the above, we have shown that minTH<Av<maxTH, and as such shown that the exponential RED algorithm proposed by the inventors has a better performance compared with the conventional RED algorithm due to it initially have a more lenient packet discard rate for lower average queue lengths, and then a more aggressive packet discard rate for higher average queue lengths, with the change in aggressiveness occurring between the two threshold values (minTH<Av<maxTH).

In the example of the present invention hereinbefore described, the packet select probability value for the exponential RED packet select probability algorithm proposed by the inventors ranges from 0 to 1, whereas for the conventional RED algorithm the packet select (discard) probability value ranges from 0 to a maximum defined packet select (discard) probability value MaxDP. The exponential RED packet select probability algorithm proposed by the inventors in this form has been found to be sufficiently flexible and can be adjusted for substantially any desired situation by way of the aggressiveness factor K, without the need to introduce more parameters, which in most situations would unnecessary complicate the algorithm too much compared with any benefit gained. However, it is contemplated that in some (unforeseen) situations it may be necessary/desirable to increase the flexibility/adjustability of the exponential RED packet select probability algorithm proposed by the inventors, whereby the added complexity of additional parameters may be outweighed by certain benefits gained. As such, it is contemplated that the packet select probability value for the exponential RED packet select probability algorithm proposed by the inventors may be limited to a maximum defined packet select (discard) probability value MaxDP in a similar manner to that of the conventional RED algorithm. For example, Equation 3 may be modified to:

$$DP = \begin{cases} 0 & \text{for } 0 \le Av \le \min TH \\ \text{Max}DP * e^{-K\frac{\max TH - Av}{\max TH - \min TH}} & \text{for } \min TH < Av \le \max TH \\ 1 & \text{for for } \max TH < Av \end{cases} \quad [\text{Equation 37}]$$

It is further contemplated that the packet select probability value for the exponential RED packet select probability algorithm proposed by the inventors may be limited to a minimum defined packet select (discard) probability value MinDP. For example, Equation 3 may be modified to:

$$DP = \begin{cases} 0 & \text{for } 0 \le Av \le \min TH \\ \text{Min}Dp + (1 - \text{Min}DP) * e^{-K\frac{\max TH - Av}{\max TH - \min TH}} & \text{for } \min TH < Av \le \max TH \\ 1 & \text{for for } \max TH < Av \end{cases} \quad [\text{Equation 38}]$$

It is still further contemplated that the packet select probability value for the exponential RED packet select probability algorithm proposed by the inventors may be limited to both a minimum defined packet select (discard) probability value MinDP and a maximum defined packet select (discard) probability value MaxDP. For example, Equation 3 may be modified to:

$$DP = \begin{cases} 0 & \text{for } 0 \le Av \le \min TH \\ \text{Min}Dp + (\text{Max}DP - \text{Min}DP) * e^{-K\frac{\max TH - Av}{\max TH - \min TH}} & \text{for } \min TH < Av \le \max TH \\ 1 & \text{for for } \max TH < Av \end{cases} \quad [\text{Equation 39}]$$

Figure 7:
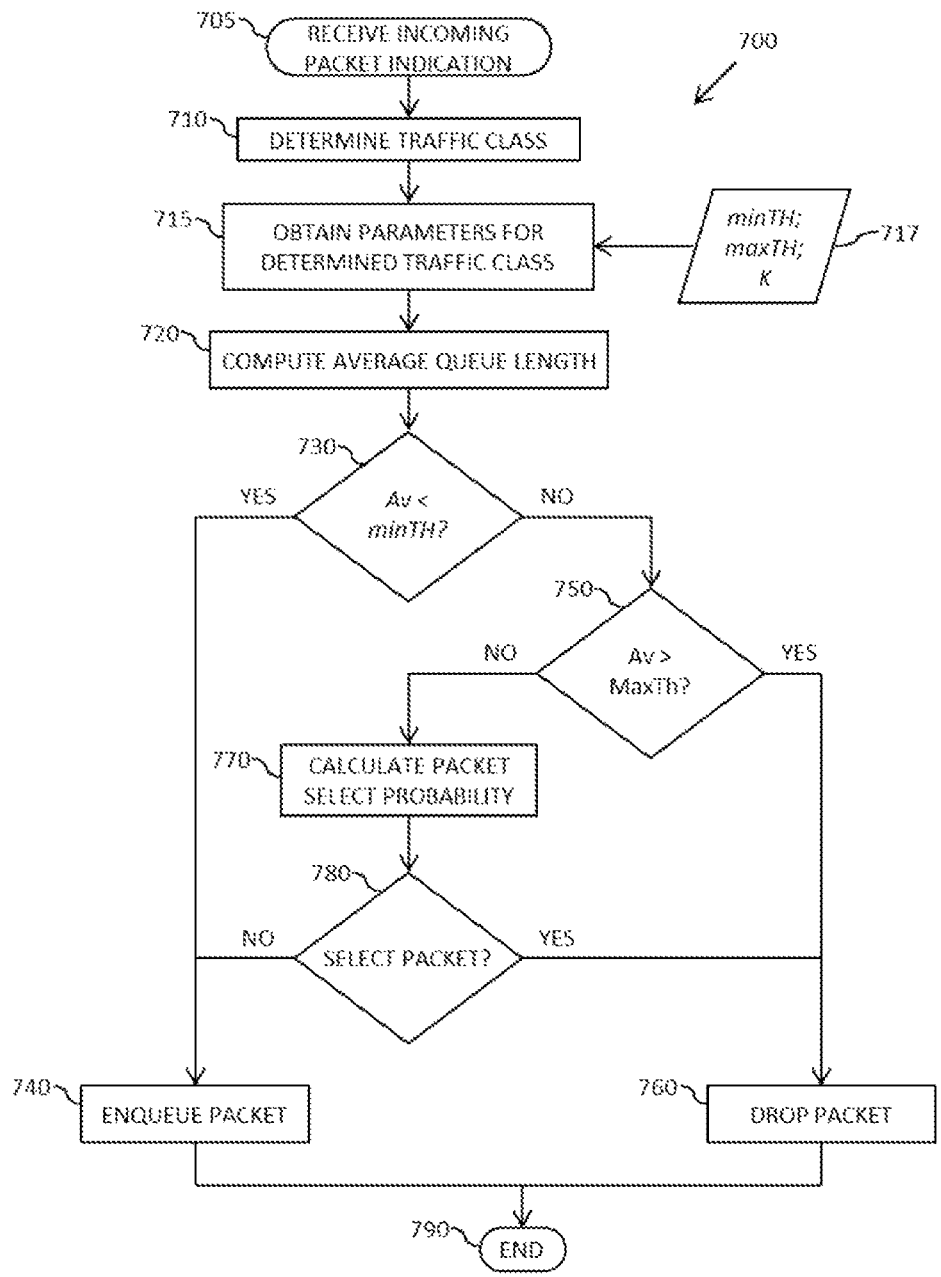
FIG. 7 illustrates a simplified flowchart of an alternative example of a method of performing Active Queue Management.

Referring now to FIG. 7 there is illustrated a simplified flowchart 700 of an alternative example of a method of performing Active Queue Management within, say, a network router or the like. The method illustrated in FIG. 7 is an extension to the method illustrated in FIG. 2, where a single queue may have several different sets of AQM parameters, each set of AQM parameters being associated with a particular traffic class. For example, a queue may have a set of AQM parameters for a lower priority class of traffic comprising lower maximum and minimum threshold values, and a set of AQM parameters for a higher priority class of traffic comprising higher maximum and minimum threshold values. As a result, a queue build-up will result in data packets corresponding to the lower priority class of traffic being selected sooner (and relatively more aggressively) than data packets corresponding to the higher priority class of traffic. In this manner, quality of service prioritization is made possible for important packets from a pool of packets using the same buffer.

The method starts at 705 with the receipt of an indication of an incoming data packet. Such an indication may comprise summary data about the incoming data packet such as information identifying a target buffer, information identifying a traffic class, etc. Alternatively, such an indication may comprise the data packet itself. Next, at 710, the class of traffic to which the received data packet belongs is determined. A set of AQM parameters for the determined traffic class are then obtained at 715, for example from a lookup table 717 or the like. The set of AQM parameters may comprise, by way of example, maximum and minimum threshold values maxTH and minTH, an aggressiveness factor K, a maximum packet select probability value MaxDP, etc.

Next, at 720, a value representative of a queue length for a target buffer is determined. In the illustrated example, the determined queue length value comprises an average queue length value representative of an average queue length for the target buffer over a period of time. An example of how such an average queue length Av may be computed is provided above in Equation 2. Having determined the queue length value for the target buffer, at 720, the method moves on to 730 where it is determined whether the determined queue length value is less than a minimum threshold value minTH.

If the determined queue length value is less than the minimum threshold value minTH, then the received incoming packet is queued within the target buffer at 740, and the method ends at 790.

Conversely, if the determined queue length value is greater than the minimum threshold value minTH, the method moves on to 750 where it is determined whether the determined queue length value is greater than a maximum threshold value maxTH.

If the determined queue length value is greater than a maximum threshold value maxTH, then in the illustrated example the packet is dropped/discarded at 760, and the method ends at 790.

Conversely, if the determined queue length value is less than a maximum threshold value maxTH, the method moves on to 770 where a packet select probability value for the received data packet is derived based on the queue length value determined at 720, for example as described in greater detail below. For clarity, the packet select probability value is analogous to the discard probability value described above in relation to the conventional RED algorithm within the background of the invention, and defined in Equation 1. The term packet select probability value is used herein with reference to the present invention to clarify that a 'selected' packet is not limited to being dropped/discarded, but may alternatively be marked (e.g. by way of a bit being set in the packet header) if the underlying transport protocol supports, say, Explicit Congestion Notification (ECN).

Having derived the packet select probability value, the method moves on to 780 wherein it is (randomly) determined whether to select the data packet based on the packet select probability value.

If it is determined not to select the data packet at 780, then the received incoming packet is queued within the target buffer at 740, and the method ends at 790.

Conversely, if it is determined to select the data packet at 780, then in the illustrated example the packet is dropped/discarded at 760, and the method ends at 790. In alternative examples, for example where the method of FIG. 7 is implemented within a network comprising a transport protocol that supports, say, Explicit Congestion Notification (ECN), if it is determined to select the data packet at 780, then the data packet may be marked (e.g. by way of a bit being set within a header thereof) in order to signal (impending) congestion, instead of dropping/discarding the data packet. In such an example, having been marked the data packet may then be queued within the target buffer (as opposed to being dropped/discarded).

Figure 8:
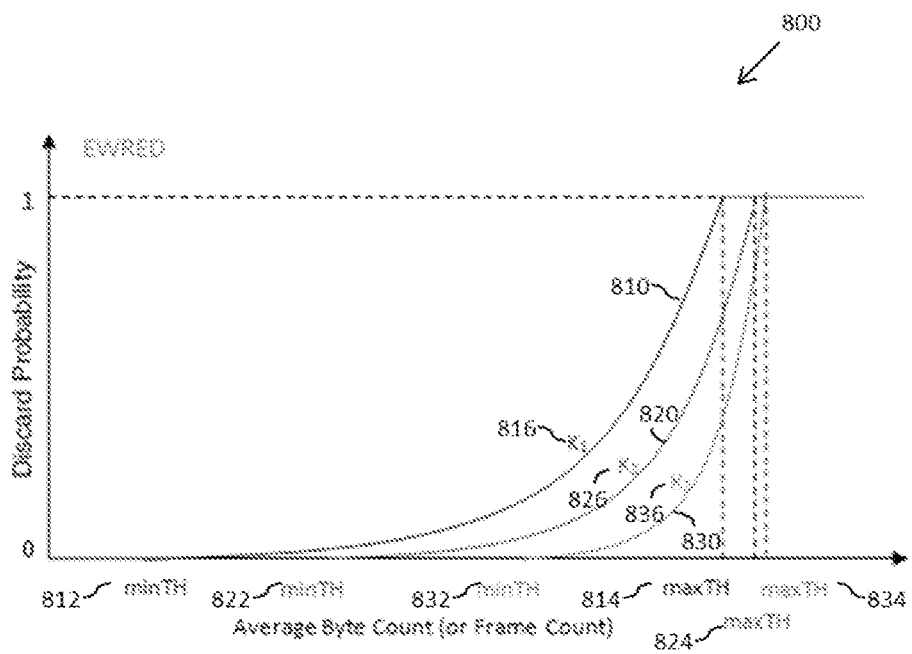
FIG. 8 illustrates a simplified graph of an example of packet select probability values versus average queue length for a plurality of different traffic classes based on different active queue management parameter sets for each traffic class.

FIG. 8 illustrates a simplified graph 800 of an example of packet select probability values versus average queue length for a plurality (three) of different traffic classes based on different active queue management parameter sets for each traffic class. A first plot 810 represents the packet select probability value versus average queue length for a first, lowest priority traffic class. For this class of traffic the packet select probability value is derived based on a first set of AQM parameters comprising a first minimum queue length threshold minTH 812, a first maximum queue length threshold maxTH 814 and a first aggressiveness factor $K_1$ 816. A second plot 820 represents the packet select probability value versus average queue length for a second, middle priority traffic class. For this class of traffic the packet select probability value is derived based on a second set of AQM parameters comprising a second minimum queue length threshold minTH 822, a second maximum queue length threshold maxTH 824 and a second aggressiveness factor $K_2$ 826. A third plot 830 represents the packet select probability value versus average queue length for a third, highest priority traffic class. For this class of traffic the packet select probability value is derived based on a third set of AQM parameters comprising a third minimum queue length threshold minTH 832, a third maximum queue length threshold maxTH 834 and a third aggressiveness factor $K_3$ 836.

As can be seen from FIG. 8, by deriving the packet select probability value is based on a set of AQM parameters for the specific class of traffic for individual data packets, the packet select probability value for data packets associated with, for example, a lower priority class of data may be arranged to increase earlier (i.e. at lower average queue lengths) whilst the packet select probability value for data packets associated with, for example, a higher priority class of data may be arranged to increase later (i.e. at higher average queue lengths). As a result, lower priority data packets are more likely to be dropped/marked sooner (and thus more often) than higher priority data packets, enabling quality of service (QoS) differentiation between several traffic classes and QoS prioritization and preferential treatment for higher priority packets.

Figure 9:
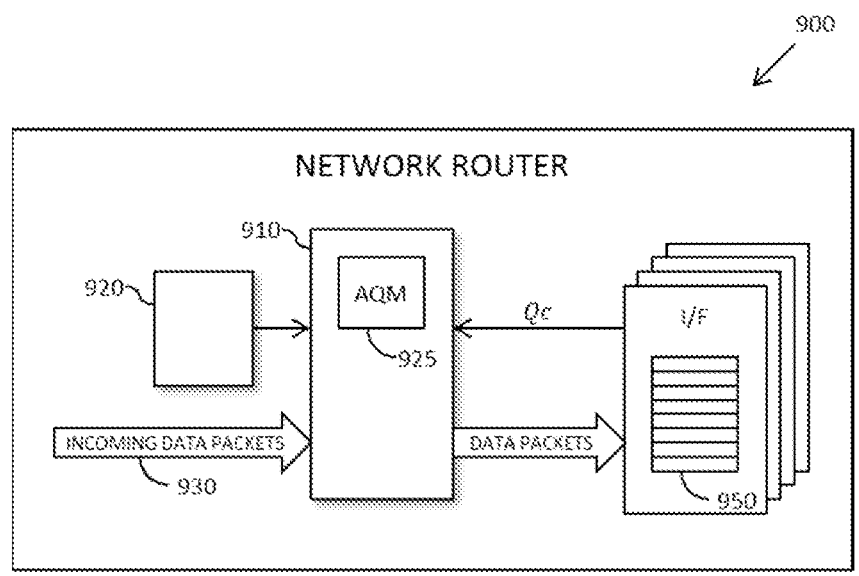
FIG. 9 illustrates a simplified block diagram of an example of a data packet routing device.

Referring not to FIG. 9, there is illustrated a simplified block diagram of an example of a data packet routing device, which in the illustrated example comprises a network router 900. The network router 900 illustrated in FIG. 9 comprises one or more signal processing components 910 arranged to execute computer program code stored within one or more memory elements, such as memory element 920. The memory element may comprise any suitable form of non-transitory computer program product such as one or more of a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

The signal processing component 910 is in particular arranged to execute active queue management computer program code 925, the active queue management computer program code 925 being operable for, upon receipt of an incoming data packet 930 by the network router 900, determining a queue length value for a target buffer 950 of the received incoming data packet, calculating a queue congestion value based at least partly on the queue length value and a packet select queue length range, and calculating the packet select probability value for the data packet based at least partly on an exponential function $e^{-x}$, where x is computed based at least partly on the queue congestion value. In particular, the active queue management computer program code 925 is operably for implementing a method of deriving a packet select probability value for a data packet as herein described, for example such as the method illustrated in FIG. 2 and herein described and/or the method illustrated in FIG. 7 and herein described.

As identified above, the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data packet routing device comprising a signal processing component, the signal processing component configured to:
   receive an indication of a data packet received at the data packet routing device;
   determine a queue length value for a target buffer of the data packet;
   calculate a queue congestion value based at least partly on the queue length value and a packet select queue length range;
   calculate a packet select probability value for the data packet based at least partly on an exponential function $e^{-x}$, where x is computed based at least partly on the queue congestion value; and
   select the data packet based on the packet select probability value, wherein the data packet routing device drops or queues the data packet based on the selection of the data packet by the signal processing component.

2. The data packet routing device of claim 1, wherein the queue congestion value $Q_{con}$ is calculated based on:

$$Q_{con} = \frac{\max TH - Av}{\max TH - \min TH}$$

where Av represents the determined queue length value, maxTH represents a maximum queue length threshold and minTH represents a minimum queue length threshold;
   maxTH-minTH defining the packet select queue length range.

3. The data packet routing device of claim 1, wherein x is further computed based on an aggressiveness factor K, such that $x=K*Q_{con}$.

4. The data packet routing device of claim 3, wherein the aggressiveness factor K comprises a user configurable aggressiveness factor.

5. The data packet routing device of claim 3, wherein the aggressiveness factor K comprises an adaptively configurable aggressiveness factor.

6. The data packet routing device of claim 1, wherein the queue length value comprises an average queue length for the target buffer of the data packet.

7. The data packet routing device of claim 6, wherein the queue length value Av is calculated based on:

$$Av = Ao*(1-2^{-n}) + Qc*(2^{-n})$$

where n represents a user configurable weighting factor, Ao represents a previously determined average queue length value and Qc represents a current queue length.

8. The data packet routing device of claim 1, wherein the signal processing component is further configured to: determine a class of traffic to which the data packet belongs, obtain a set of active queue management parameters for the determined class of traffic, and derive a packet select probability value for the data packet based at least partly on the obtained set of active queue management parameters.

9. The data packet routing device of claim 8, wherein the set of active queue management parameters comprises at least one from a group comprising at least one of:
- a maximum queue length threshold maxTH;
- a minimum queue length threshold minTH; and
- an aggressiveness factor K.

10. The data packet routing device of claim 1, wherein the signal processing component implements a random early detection active queue management process using the packet select probability value.

11. A non-transitory computer program product comprising executable program code stored therein for deriving a packet select probability value for a data packet and selecting the data packet based on the packet select probability value, the program code executable to:
- receive an indication of receipt of the data packet;
- determine a queue length value for a target buffer of the data packet;
- calculate a queue congestion value based at least partly on the queue length value and a packet select queue length range;
- calculate the packet select probability value for the data packet based at least partly on an exponential function $e^{-x}$, where x is computed based at least partly on the queue congestion value;
- select the data packet based on the packet select probability value; and
- drop or queue the data packet based on the selection of the data packet.

12. The non-transitory computer program product of claim 11, wherein the non-transitory computer program product comprises at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

13. The non-transitory computer program product of claim 11, wherein the queue congestion value $Q_{con}$ is calculated based on:

$$Q_{con} = \frac{\text{maxTH} - Av}{\text{maxTH} - \text{minTH}}$$

where Av represents the determined queue length value, maxTH represents a maximum queue length threshold and minTH represents a minimum queue length threshold;

maxTH-minTH defining the packet select queue length range.

14. The non-transitory computer program product of claim 11, wherein x is further computed based on an aggressiveness factor K, such that $x=K*Q_{con}$.

15. The non-transitory computer program product of claim 14, wherein the aggressiveness factor K comprises a user configurable aggressiveness factor.

16. The non-transitory computer program product of claim 14, wherein the aggressiveness factor K comprises an adaptively configurable aggressiveness factor.

17. The non-transitory computer program product of claim 11, wherein the queue length value comprises an average queue length for the target buffer of the data packet.

18. The non-transitory computer program product of claim 17, wherein the queue length value Av is calculated based on:

$$Av = Ao*(1-2^{-n}) + Qc*(2^{-n})$$

where n represents a user configurable weighting factor, Ao represents a previously determined average queue length value and Qc represents a current queue length.

* * * * *